3,102,867
POLYMER EMULSION CONTAINING SULFONIUM EMULSIFIER

Emmett Loren Buhle, Media, Pa., assignor to E. I. du Pont de Nemours and Company, Wilmington, Del., a corporation of Delaware
No Drawing. Filed Mar. 10, 1960, Ser. No. 14,007
5 Claims. (Cl. 260—29.6)

This invention relates to coating compositions and more particularly to aqueous dispersion coating compositions containing at least one of a specific class of addition polymers and at least one convertible sulfonium dispersing agent.

In recent years increasing emphasis has been placed on aqueous dispersion coating compositions as replacements for solution-type coating compositions. Aqueous dispersion coating compositions can usually be applied at much higher solids concentrations than corresponding solution-type coating compositions. In addition, aqueous coating compositions eliminate many of the toxicity and inflammability problems of conventional solution-type coating compositions. Furthermore, addition polymers can be conveniently and inexpensively prepared by aqueous emulsion polymerization. Thus, in many cases aqueous emulsion polymerizates, usually together with additives such as pigments, extenders, dispersing agents and the like, can be used without a costly and time-consuming separation of polymers from a polymerization medium.

Aqueous dispersion coating compositions are usually prepared by emulsifying ethylenically unsaturated polymerizable monomers in a solution of dispersing agent and initiator, then agitating the resulting reaction mixture, usually at slightly elevated temperature, until the reaction has run to completion. The resulting aqueous dispersion can be used directly as a coating composition; however, usually it is formulated with pigments, extenders, coalescing agents and the like by conventional procedures. The dispersing agents used in the aforementioned compositions are usually anionic but, in some cases, are non-ionic or cationic dispersing agents. Anionic and cationic dispersing agents dissociate in water to form anionic-active or cationic-active radicals, respectively, comprising charged organophilic groups. Non-ionic dispersing agents usually do not dissociate, but contain both organophilic and hydrophilic groups.

In some coating compositions, for example, aqueous dispersions of polytetrafluoroethylene, the aforementioned dispersing agents are destroyed or volatilized during baking at high temperatures; however, in most coating compositions, the dispersing agents remain in the dried coatings thereof. The dispersing agents remaining in coatings of conventional aqueous dispersion coating compositions lead to several problems. First, the ionic residues of anionic and cationic dispersing agents or the hydrophilic portions of non-ionic dispersing agents increase the water sensitivity of coatings obtained from conventional aqueous dispersion coating compositions, particularly when the polymers therein are somewhat water sensitive per se. This water sensitivity in turn results in several problems such as, for example, blistering and blushing of the coatings and corrosion of the substrates over which the coating compositions are applied. Blistering may be caused by water being drawn through and collecting under dried coatings of conventional aqueous dispersion coating compositions by the aforementioned dispersing agents. Blushing refers to the hazy, cloudy appearance in coatings exposed to water which is believed to be caused by water absorbed in microscopic voids in the coatings. Water sensitivity of conventional aqueous dispersion coating compositions caused by the dispersing agents therein may also necessitate prime coating or other corrosion-inhibiting treatment of substrates over which such compositions are applied. The water sensitivity of conventional coating compositions can also adversely affect the durability of dry coatings thereof, primarily by reducing gloss.

The ionic or hydrophilic portions of conventional dispersing agents left in aqueous coating compositions after they are dried also can, for example, increase the electrical conductivity thereof. In addition, where, for example, fabrics, papers and the like are coated with such compositions, the residual dispersing agents therein may cause spreading and tinting of aqueous inks applied thereto, for example, in offset printing of book cover materials.

Attempts to form aqueous dispersion coating compositions free of the aforementioned undesirable dispersing agent residues have met with little success heretofore. The conventional dispersing agents in known aqueous coating compositions usually cannot be decomposed by heat, for example, by baking the dried coatings of the compositions, because the dispersing agents decompose at temperatures higher than the polymers therein. Attempts to use dispersing agents which decompose at lower temperatures usually have resulted in coating compositions which are unstable because the dispersing agents decompose during storage. Also, in order to avoid decomposition of the dispersing agents during polymerization, the reactions must be run at such low temperatures that impractically long reaction times are necessary.

This invention provides aqueous coating compositions which are stable and which yield dry coatings, free from ionic and hydrophilic residues, which have improved water resistance, durability, electrical resistance and the like.

Coating compositions of this invention comprise an aqueous dispersion containing at least one addition polymer of at least one of the class consisting of conjugated dienes, vinyl chloride, styrene, acrylonitrile, vinyl carboxylates and acrylic esters and about from 0.1 to 5%, based on the weight of polymer, of at least one dispersing agent having the structural formula:

wherein $R_1$ is selected from the class consisting of aryl, alkoxyaryl, alkaryl and chloroaryl radicals, $R_2$ and $R_3$ are organic radicals of up to about 18 atoms having a methylene group bonded to the sulfur atom, one of $R_1$, $R_2$ and $R_3$ bears a chain containing about from 9 to 18 carbon atoms, the total carbon atoms in the cationic portion of the compound being no greater than about 30 and $Y^-$ is a saturated acid anion of 1 to 4 carbon atoms.

As stated above, the polymers used in this invention are prepared from at least one of the class consisting of conjugated dienes, vinyl chloride, styrene, acrylonitrile, vinyl carboxylates and acrylic esters. Examples of conjugated dienes are the 1,3-butadienes such as butadiene itself, chloroprene, isoprene, 2-methyl butadiene-1,3, 2-ethyl butadiene-1,3, 2,3-dimethyl butadiene-1,3 and the like. Examples of vinyl carboxylates, that is, monocarboxylic acid esters of vinyl alcohol, are vinyl acetate, vinyl propionate, vinyl butyrate, vinyl caprolate, vinyl laurate, vinyl palmitate, vinyl benzoate and the like. Examples of acrylic esters, that is, esters of acrylic and alpha-substituted acrylic acids are methyl acrylate, ethyl acrylate, propyl acrylate, isopropyl acrylate, isobutyl acrylate, amyl acrylate, octyl acrylate, 2-ethyl hexyl acrylate, methyl methacrylate, ethyl methacrylate, butyl methacrylate, lauryl methacrylate, methyl ethacrylate, benzyl acrylate and dimethyl itaconate.

The materials described above are free from radicals which react with the dispersing agents used in the compositions of this invention. Specifically, in aqueous solution they do not contain free —COO⁻ groups and are free from alkylatable hydrogen, that is, phenolic hydroxyl groups, amino groups and mercapto (—SH) groups. Also, they are cationic dispersible, that is, they are not strongly anionic and can be dispersed by cationic-active dispersing agents.

The polymers used in the compositions of this invention can be homopolymers of the aforementioned polymerizable monomers or copolymers thereof. Typical copolymers thereof. Typical copolymers includes, for example, copolymers of butadiene and styrene, copolymers of butadiene and acrylonitrile, copolymers of vinyl chloride and vinyl acetate, copolymers of vinyl acetate and the 1 to 8 carbon atom alkanol esters of acrylic and methacrylic acid, copolymers of the 1 to 4 carbon atom alkanol esters of acrylic and methacrylic acid and copolymers of acrylonitrile with the 1 to 4 carbon atom alkanol esters of acrylic and methacrylic acid.

Polymers of vinyl acetate are particularly preferred. Polymers of vinyl acetate are characteristically water sensitive. Nevertheless, homopolymers and copolymers of vinyl acetate are relatively inexpensive, have excellent adhesion and are tough. In accordance with this invention, the objectionable water sensitivity of aqueous dispersion coating compositions of homopolymers and copolymers of vinyl acetate is considerably reduced thus making it possible to make fuller use of the aforementioned desirable properties of such polymers.

As stated hereinbefore, the dispersing agents used in this invention have the structural formula:

wherein $R_1$, $R_2$, $R_3$ and $Y^-$ have the meanings specified hereinbefore. The aryl group in $R_1$ must be directly attached to the sulfur atom in order that the compositions of this invention have the combination of stability and convertibility discussed more fully hereinafter. $R_1$ is preferably a hydrocarbon radical of 6 to 14 carbon atoms having a phenyl radical directly attached to the sulfur atom and $R_2$ and $R_3$ are preferably alkyl radicals because such compounds yield compositions which have an optimum combination of convertibility and stability. Also, preferably one of $R_2$ and $R_3$ is a methyl or ethyl radical because of the ease of preparation of compounds having such substituents and because of the availability of the reactants used therefor.

At least one of $R_1$, $R_2$ and $R_3$ must bear a chain containing about from 9 to 18 carbon atoms. This chain provides the necessary organophilic properties of the cationic portion of the dispersing agents. Of course, as is conventional in the art, if this chain contains an aryl radical, the aryl radical is counted as the equivalent (as far as hydrophilic character is concerned) of its alkyl counterpart. Thus, for example, if $R_1$ is a p-hexylphenyl radical, this radical is counted as having a chain length of 10 carbon atoms. If the aforementioned organophilic chain bears an organophilic constituent other than carbon, for example, a chlorine substituent, preferably shorter chains the used. Conversely, if it contains a hydrophilic constituent, for example, an interposed ether linkage, chains approaching the upper limit of about 18 carbon atoms are preferred. Preferably there are a total of about from 14 to 25 carbon atoms in the cationic portion of the dispersing agents. $Y^-$ is preferably an acetate or propionate radical. $Y^-$ should be free of polymerizable ethylenic unsaturation to avoid reaction of the dispersing agent during emulsion polymerization.

Illustrative dispersing agents useful in the compositions of this invention are dodecylmethylphenylsulfonium acetate, dodecylmethyl-p-tolylsulfonium acetate, dodecyl-methyl-m-chlorophenylsulfonium acetate, dodecylmethyl-p-chlorophenylsulfonium acetate, dodecylmethyl-p-methoxyphenylsulfonium acetate, dimethyl-p-dodecylphenylsulfonium acetate, octadecylmethylphenylsulfonium acetate, dodecylethylphenylsulfonium acetate, 12-chlorododecylmethylphenylsulfonium acetate, butoxydecylmethylphenylsulfonium acetate, dodecylmethylphenylsulfonium bicarbonate, dodecylmethylphenylsulfonium propionate, dodecylmethyl-beta-naphthylsulfonium acetate, 3-dodecenylmethylphenylsulfonium acetate and mixtures thereof. In relating the aforementioned compounds to the structural formula above, $R_3$ and $R_2$ are specified first, then $R_1$ and finally $Y^-$. Thus, dodecylmethylphenylsulfonium acetate, before it is dissocated in water, has the formula:

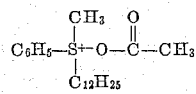

As stated hereinbefore, compositions of this invention contain about from 0.1 to 5% of dispersing agent based on the weight of polymer. The lower limit on the amount of dispersing agent is governed largely by dispersibility of the polymers used in the compositions. If greater than about 5% of dispersing agent, for example, 20 to 30%, is used, the stability of the coating compositions of this invention is adversely effected. Also, within the aforementioned limits the amount of dispersing agent used depends somewhat upon the particular dispersing agent selected and its dispersing power. Preferably about from 0.5 to 2% of the dispersing agent is used.

A convenient and preferred procedure for preparing the dispersing agents used in the compositions of this invention is to first form a sulfide of the formula $R_1SR_3$, then react this sulfide with a sulfate of the formula $(R_2)_2SO_4$, for example, at a temperature of about 75 to 150° C. until the reaction is substantially complete, that is, until the reaction mixture is substantially completely soluble in water. Finally, the resulting sulfate is passed through an anion exchange resin to replace the sulfate with the appropriate anion $Y^-$ specified above. Suitable anion exchange resins include, for example, those obtained by treating poly(quaternary ammonium chloride) anion exchange resins with sodium salts of the aforementioned anion $Y^-$, for example, sodium acetate, sodium propionate, sodium bicarbonate or the like, to replace the chloride in the resin with the appropriate anion of the dispersing agents.

The aforementioned sulfides used as the starting materials for preparing the dispersing agents used in the compositions of this invention can be prepared in the known manner, for example, by reacting a mercaptan of the formula $R_1SH$ or $R_3SH$ with a compound of the formula $ClR_3$ or $BrR_3$, or $ClR_1$ or $BrR_1$, respectively, in the presence of excess potassium hydroxide or sodium ethoxide or methoxide under reflux conditions until the reaction runs substantially to completion. Also, for example, the aforementioned sulfides can be prepared by reacting one of the aforementioned mercaptans with a compound having a terminal vinyl group to yield the appropriate sulfide; for example, thiophenol can be reacted with 1-dodecylene in the presence of a peroxide or azo catalyst to yield dodecylphenyl sulfide.

In the compositions of this invention and in the proportions specified above, the aforementioned dispersing agents have the novel and unique combination of stability in aqueous dispersion and convertibility in dry coatings not exhibited by other conventional dispersing agents or by other compounds of analogous structure. When the compositions of this invention are dried, the dispersing agents therein react to yield by-products which are neither ionic nor hydrophilic. For example, when a coating composition of this invention containing dodecylmethylphenylsulfonium acetate dispersing agent is dried, the dispersing agent reacts substantially as follows:

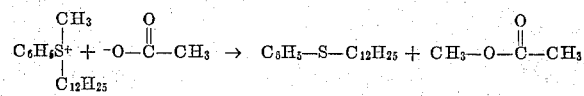

Dodecylphenyl sulfide is neither hydrophilic nor ionic and remains in the coating without altering the properties thereof. The methyl acetate, which is also neither ionic nor hydrophilic, evaporates from the coating.

In the preparation of the compositions of this invention, the dispersing agent and initiator for the polymerization reaction are usually first dissolved in water. Examples of initiators are azo and peroxide initiators such as 2,2'-azobis(isobutyronitrile), 2,2'-azobis(isobutyramidine)dihydrochloride, hydrogen peroxide, tertiarybutyl hydroperoxide, benzoyl peroxide, lauryl peroxide and the like. Preferably, about from 0.01 to 1.0% of initiator, based on the weight of polymerizable monomers, is used. Also, preferably inorganic initiators such as the conventional persulfate-bisulfite initiators are avoided since, unless these initiators are used in very small proportions, they leave ionic residues in the dried coating compositions in sufficient quantities to mask or decrease the desirable effect of the dispersing agents used in the compositions of this invention.

Next, the polymerizable materials described hereinbefore are charged to the reaction mixture and heated with vigorous agitation at a temperature of about from 5 to 70° C. until the reaction is substantially complete, usually about from 5 to 20 hours. Preferably the reaction temperature is kept as low as possible, particularly with the more readily convertible of the aforementioned dispersing agents, to prevent premature conversion thereof. Also, monomeric materials are preferably charged slowly to the reaction mixture in order to minimize localized overheating.

Compositions containing about from 20 to 50% of polymer and having a pH of about from 3 to 9 are preferred. The pH of the compositions can be adjusted with ammonium hydroxide.

As is conventional in the art, well known modifiers such as pigments and extenders, plasticizers, flow-control agents, coalescing agents and the like can be added to the compositions of this invention in conventional amounts. Examples of pigments and extenders are metal oxides, chromates, silicates and carbonates, carbon blacks, organic dyes and lakes thereof and metal flake pigments. Examples of other additives are plasticizers such as dibenzyl phthalate, butyl benzyl phthalate, tricresyl phosphate, di(2-ethylhexyl)phthalate and di(2-ethylhexyl) azelate and coalescing agents such as diacetone alcohol, cyclic ethylene carbonates, alkyl monoethers of ethylene glycol or diethylene glycol and the like. Also, small portions of organic solvent such as toluene, xylene or benzene can be added to adjust the viscosity of the compositions and facilitate coalescence of the polymers therein. As is obvious from the aforementioned discussion, additives which will react with the dispersing agents used in the compositions of this invention or which are coagulated by cationic dispersing agents should be excluded.

The coating compositions of this invention can be applied by any conventional coating techniques such as, for example, spray, brush, roller, reverse roller or calender coating. The compositions can be applied and dried at room temperature. Preferably, in order to accelerate the conversion of the dispersing agents therein, they are often given a short drying at elevated temperature; for example, they are often dried at 60 to 125° C. for about from 5 to 30 minutes. In some cases, it may be desirable to bake the coating compositions at higher temperatures, for example, 100 to 250° C. in order to improve the film properties, for example, smoothness, of the polymers therein. However, as far as the conversion of the dispersing agents used in the compositions to non-ionic and non-hydrophilic compounds is concerned, this baking is not necessary.

The coating compositions of this invention are stable, yet on drying the dispersing agents therein readily convert to compounds which are neither ionic nor hydrophilic. The compositions of this invention can be applied to any of the wide variety of substrates upon which aqueous dispersions coating compositions are now applied. These include, for example, metal, wood, glass, fabrics, paper and the like. Dried coatings on such substrates have improved water resistance, durability and electrical resistance as compared with conventional aqueous dispersion coating composition containing conventional dispersing agents.

In the following examples, which illustrate this invention, parts and percentages are by weight unless otherwise specified.

EXAMPLE 1
*Preparation of Dispersing Agent*

Dodecylphenyl sulfide is prepared in the conventional manner by reacting 1-chlorododecane with thiophenol in an ethanol solution of potassium hydroxide. 85.5 parts of dodecylphenyl sulfide is charged to a closed reaction vessel together with 44.1 parts of dimethyl sulfate. The reaction mixture is heated at 60° C. for 16 hours to yield dodecylmethylphenylsulfonium methosulfate, a viscous, water soluble, pale amber liquid.

A column is packed with a poly(quaternary ammonium chloride) anion exchange resin ("Amberlite" IRA–400, a proprietary product of the Rohm & Haas Company). A solution of sodium acetate is passed through the column until the effluent from the column is free of chloride ion, then the column is washed with distilled water. 114 parts of dodecylmethylphenylsulfonium methosulfate prepared as described above is dissolved in 336 parts of water and passed through the column. The column is washed with 450 parts of distilled water, then the product from the column is concentrated by blowing a stream of dry air thereover to yield a solution containing about 11.6% of dodecylmethylphenylsulfonium acetate( about 0.33 molar) and a small portion of free acetic acid (about 0.01 M) and having a pH of 6.4.

The convertibility of the above dispersing agent is determined by measuring the sulfonium ion concentration of an aqueous solution of the dispersing agent and of a sample prepared by drying the solution of dispersing agent, redispersing the dried sample in water and measuring the sulfonium ion concentration thereof. The sulfonium ion concentration is determined by first taking about 5 parts of a 0.04% aqueous solution of the sample to be tested and acidifying it with about 0.04 part of 0.5 M sulfuric acid, then 0.05 part of an aqueous solution containing about 6% of $CoCl_2 \cdot 6H_2O$ and about 9% of $NH_4SCN$ is added thereto. Finally, about 5 parts of methyl isobutyl ketone is added and the resulting blue sulfonium complex is extracted therefrom in the methyl isobutyl ketone layer. The optical density of the resulting solution is measured in the conventional manner and compared with solutions of known sulfonium ion concentration, for example, solutions of dodecylmethylphenylsulfonium methosulfate. Conversion of the aforementioned dispersing agent on drying is accelerated by decreasing the relative humidity or increasing temperature at which the dispersing agent is dried. Typically, for example, if a thin film of an aqueous solution of the dispersing agent is held at 100° C. for 5 minutes in an atmosphere having a relative humidity of less than about 5%, the dispersing agent is greater than 95% converted to dodecyl phenyl sulfide. Conversely, if the sample is held in an atmosphere at 50% relative humidity and at temperatures of 23 and 30°, 16 and 3 days, respectively, are required for 95% conversion.

*Preparation of Coating Composition*

One part of dodecylmethylphenylsulfonium acetate and 0.02 part of 2,2'-azobis(isobutyramidine)dihydrochloride are dissolved in 183 parts of water. Next, 100 parts of vinyl acetate are charged thereto. The reaction mixture is held under autogeneous pressure at 50° C. for 15 hours with vigorous agitation to yield a product containing about 34% of polyvinyl acetate (92% conversion) and about 1%, based on the weight of polymer, of dodecylmethylphenylsulfonium acetate dispersing agent and having a pH of about 4.8. This aqueous dispersion is stable after storage at room temperature for 7 months.

The product described above can be used directly as a clear coating composition or it can be modified in the conventional manner with pigments, fillers, flow-control agents, coalescing agents and the like. A typical coating composition is prepared by milling 100 parts of the aqueous dispersion described above with about 10 parts diacetone alcohol and 100 parts of a mill base containing about 25% of titanium dioxide, 10% of calcium metasilicate, 34% of china clay, 30% of water and 1% of dodecylmethylphenylsulfonium acetate.

*Evaluation of Coating Composiiton*

The clear coating composition described above is tested for water sensitivity. Samples are prepared for testing by diluting the emulsion described above to 20% solids, then spraying it on appropriate substrates described hereinafter to yield 2-mil thick dry films. Each coating is given a quick drying at 75° C. for 2 minutes, then dried at 75° C. for 30 minutes.

Blushing is determined by coating glass panels and measuring the optical density, expressed as percent of scattered light, of the coatings after the coated panels have been immersed in water at about room temperature for about 24 hours. Coatings containing no dispersing agent (solution coatings of polyvinyl acetate) scatter about 11% of the light passing therethrough. Coatings of the coating composition of this example scatter about 8% of the light. Coatings formed from an aqueous coating composition prepared as described above but using a conventional sodium lauryl sulfate dispersing agent scatter about 96% of the incident light. Thus, coatings containing no dispersing agent or the convertible dispersing agent described above are substantially blush-free and are clear while the coatings containing the conventional dispersing agent, sodium lauryl sulfate, are severely blushed, white and practically opaque.

Blistering and underrusting are tested by spraying bare steel panels with the clear coating composition described above. The panels are then held in water at 40° C. for about 4 days. Panels coated with the aqueous coating composition described above containing dodecylmethylphenylsulfonium acetate dispersing agent show substantially no blistering or underrusting. Similar aqueous polyvinyl acetate coating compositions containing sodium lauryl sulfate dispersing agent show considerable rusting underneath the coatings and large blisters in the coatings. Solution coatings of polyvinyl acetate yield products with fine blisters and fine yellow rusting underneath the coating.

Substrates coated with coating compositions of this example also show improved electrical resistance as compared with similar coating compositions containing sodium lauryl sulfate dispersing agent.

EXAMPLE 2

Dodecyl-p-chlorophenyl sulfide is prepared by reacting p-chlorothiophenol with 1-chlorododecane in an alcohol solution of sodium ethoxide. Next, using the general procedure described in Example 1, the dodecyl-p-chlorophenyl sulfide is reacted with dimethyl sulfate to yield dodecylmethyl-p-chlorophenylsulfonium methosulfate. This product is then passed through a poly(quaternary ammonium acetate) anion exchange resin as described in Example 1 to yield dodecylmethyl-p-chlorophenylsulfonium acetate dispersing agent.

An aqueous solution is formed from about 183 parts of water, 1 part of the dodecylmethyl-p-chlorophenylsulfonium acetate and 0.04 part of 2,2'-azobis(isobutyramidine)dihydrochloride, then 100 parts of vinyl acetate are added thereto and the resulting mixture heated for about 10 hours at a temperature of about 50° C. with rapid agitation to yield a coating composition of this invention. The coating composition shows improved water resistance by the tests previously described as compared with similar coating compositions containing conventional anionic, nonionic or cationic dispersing agents.

If an equal weight of dimethyl-p-dodecylphenylsulfonium acetate is substituted for the dispersing agent used in this example substantially similar results are obtained.

EXAMPLE 3

Dodecylmethyl-p-tolylsulfonium acetate is prepared by the general procedure described in Example 1 using p-tolyl mercaptan instead of the thiophenol used in that preparation.

A solution is formed from 184 parts of water, 0.02 part of 2,2'-azobis(isobutyramidine)dihydrochloride and 1 part of the dodecylmethyl-p-tolylsulfonium acetate dispersing agent described above. 100 parts of methyl methacrylate are added slowly to the above solution, shaken vigorously and held at a temperature of 60° C. for 15 hours. The resulting composition of this invention contains about 35.4% of polymethyl methacrylate (97.6% conversion) and has a pH of about 5.4. This product shows improved resistance to water as compared with similar aqueous dispersion coating compositions of polymethyl methacrylate containing conventional dispersing agents such as sodium lauryl sulfate.

EXAMPLE 4

Octadecylphenyl sulfide is prepared by reacting thiophenol with 1-bromooctadecane in a solution of potassium hydroxide dissolved in ethanol. The resulting product is next reacted with dimethyl sulfate as previously described, then passed through an acetate anion exchange resin to yield octadecylmethylphenylsulfonium acetate.

One part of octadecylmethylphenylsulfonium acetate dispersing agent, 0.04 part of 2,2'-azobis(isobutyramidine) dihydrochloride are dissolved in 183 parts of water, then 66 parts of acrylonitrile and 34 parts of butyl acrylate are added thereto. The reaction mixture is shaken vigorously and held at a temperature of about 60° C. for about 15 hours to yield a water resistant coating composition of this invention. The polymer in the composition of this example contains about 65% of acrylonitrile and about 35% of butyl acrylate.

EXAMPLE 5

One part of dodecylmethylphenylsulfonium acetate and 0.04 part of 2,2'-azobis(isobutyramidine)dihydrochloride are dissolved in 183 parts of water, then 100 parts of vinyl propionate are added thereto. The resulting reaction mixture is heated at 60° C. for 7 hours to yield a stable aqueous dispersion coating composition of this invention having a pH of about 4.6 and containing about 34.5% of polyvinyl propionate (92% conversion). This product, when coated on substrates as previously described, dries to yield a coating having improved resistance to blistering, blushing and underrusting.

EXAMPLE 6

Dodecyl-p-methoxyphenyl sulfide is prepared by reacting p-methoxythiophenol with 1-chlorododecane in an ethanol solution of sodium ethoxide. The resulting product is then reacted with dimethyl sulfate and passed through an acetate anion exchange column as previously described to yield dodecylmethyl-p-methoxyphenylsulfonium acetate.

A solution is formed from 0.02 part of 2,2'-azobis(isobutyramidine)dihydrochloride, 1 part of the dodecylmethyl-p-methoxyphenylsulfonium acetate dispersing agent described above and 183 parts of water. To this solution are added 70 parts of ethyl acrylate and 30 parts of methyl methacrylate. The resulting reaction mixture is then heated with rapid agitation at a temperature of 60° C. for 15 hours to yield an aqueous coating composition of this invention. The dispersing agent in the product of this example is somewhat more stable than the dispersing agent described in the previous examples; thus, the composition of this example is preferably dried at somewhat elevated temperatures, for example, 100 to 150° C. for about 20 to 30 minutes.

EXAMPLE 7

A solution is formed from 117 parts of water, 0.75 part of dodecylmethylphenylsulfonium acetate and 0.15 part of 2,2'-azobis(isobutyramidine)dihydrochloride. To this solution are charged 20 parts of styrene and 30 parts of ethyl acrylate. The reaction mixture is heated with vigorous agitation for 15 hours at 50° C. to yield an opalescent aqueous coating composition of this invention.

EXAMPLE 8

A solution is formed of 200 parts of water, 2 parts of dodecylmethylphenylsulfonium acetate and 0.3 part of 2,2'-azobis(isobutyronitrile). To this solution are charged 100 parts of butadiene and 18 parts of acrylonitrile, then the resulting reaction mixture is heated for 20 hours at 60° C. with rapid agitation to yield a coating composition of this invention.

EXAMPLE 9

A bicarbonate anion exchange resin is prepared by treating a poly(quaternary ammonium chloride) anion exchange resin ("Amberlite" IRA-400) with sodium bicarbonate by the general procedure described in Example 1. An aqueous solution of dodecylmethylphenylsulfonium methosulfate is passed through the column to yield dodecylmethylphenylsulfonium bicarbonate. A solution is formed from 1 part of the dispersing agent described above, 183 parts of water and 0.2 part of 2,2'-azobis(isobutyramidine)dihydrochloride. Finally, 100 parts of vinyl acetate are added thereto and the reaction mixture heated at 60° C. for about 16 hours. Panels are coated with this coating composition and air dried for about 2 hours at about 60° C. The dried coatings have a water resistance similar to that of the products of this invention described in Example 1.

EXAMPLE 10

An autoclave is evacuated to 8 mm. Hg absolute pressure and cooled to about −20° C., then 6.5 parts of vinyl chloride are charged thereto. The autoclave is slowly warmed to 17° C., then an aqueous solution of 16.5 parts of water, 0.045 part of dodecylmethylphenylsulfonium acetate and 0.020 part of 2,2'-azobis(isobutyramidine)dihydrochloride is slowly added thereto with rapid agitation. The reaction mixture is slowly raised to about 50 to 55° C. and held under autogenous pressure at this temperature. The total reaction time is about 4 hours. Finally, the reaction mixture is cooled to room temperature to yield a coating composition of this invention containing about 27% solids (96% conversion to polyvinyl chloride) and having a pH of about 3. The pH of the dispersion is raised to about 10 with ammonium hydroxide.

A plasticized coating composition is prepared by milling 11.6 parts of di(2-ethylhexyl)phthalate, 1.4 parts of epoxidized soya bean oil and 0.8 part of thermal stabilizer with 100 parts of the above aqueous coating composition. The resulting coating composition is cast on a panel, dried at 110° C., then pressed at 175° C. for 10 minutes to yield a smooth coating about 10 mils thick. Next, the coating is immersed in water at room temperature for about 5 hours. At the end of this period, the coating picks up only about 0.5% of water and is clear. Coatings of polyvinyl chloride are also prepared from conventional aqueous dispersion coating compositions of polyvinyl chloride containing conventional anionic dispersing agents. After being immersed in water at room temperature for about 5 hours, these coatings are white, blistered and contain more than 4% of water.

A window shade coating composition is prepared by first preparing a mill base by thoroughly dispersing the 5.2 parts of di(2-ethylhexyl)phthalate, 5.2 parts of butyl benzyl phthalate, 73.2 parts of antimony trioxide, 24.4 parts of zinc oxide and 1.6 parts of thermal stabilizer in 80 parts of toluene. Next, about 140 parts of toluene are added to 200 parts of the aqueous dispersion of polyvinyl chloride described above. The mill base is then thoroughly blended with the resulting aqueous dispersion and an additional 40 parts of toluene added thereto. The resulting coating composition is applied to a window shade fabric, dried and calendered.

I claim:

1. A coating composition which comprises an aqueous dispersion containing at least one addition polymer of at least one of the class consisting of conjugated dienes, vinyl chloride, styrene, acrylonitrile, vinyl carboxylates and acrylic esters and dispersing agent consisting essentially of about from 0.1 to 5%, based on the weight of polymer, of at least one dispersing agent having the structural formula:

wherein $R_1$ is one of the class consisting of aryl, alkoxyaryl, alkaryl and chloroaryl radicals, $R_2$ and $R_3$ are organic radicals of up to about 18 atoms having a methylene group bonded to the sulfur atom and one of $R_1$, $R_2$ and $R_3$ bears a chain containing about from 9 to 18 carbon atoms, the total carbon atoms in the cationic portion of said compound being no greater than about 30 and $Y^-$ is a saturated acid anion of 1 to 4 carbon atoms.

2. A coating composition of claim 1 wherein in said dispersing agent, $R_1$ is a hydrocarbon radical of 6 to 14 carbon atoms, $R_2$ and $R_3$ are alkyl radicals and the total number of carbon atoms in the cationic portion of said dispersing agent is about from 14 to 25.

3. A composition of claim 2 wherein said polymer is a polymer of vinyl acetate.

4. A composition comprising an aqueous dispersion of a polymer of vinyl acetate and dispersing agent consisting essentially of about from 0.3 to 2%, based on the weight of said polymer, of dodecylmethylphenyl sulfonium acetate.

5. A coating composition comprising an aqueous dispersion and a polymer of vinyl acetate and dispersing agent consisting essentially of about from 0.3 to 2%, based on the weight of said polymer, of dodecylmethyl-p-tolylsulfonium acetate.

References Cited in the file of this patent

UNITED STATES PATENTS 2,121,823     Piggott     June 28, 1938
2,536,018     Schoenholz     Jan. 2, 1951